(12) United States Patent
Hara

(10) Patent No.: US 6,704,080 B2
(45) Date of Patent: Mar. 9, 2004

(54) SEMI-TRANSMITTING REFLECTIVE PLATE, SEMI-TRANSMITTING POLARIZER, AND LIQUID CRYSTAL DISPLAY USING SAME

(75) Inventor: Kazutaka Hara, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/253,635

(22) Filed: Sep. 25, 2002

(65) Prior Publication Data

US 2003/0058384 A1 Mar. 27, 2003

(30) Foreign Application Priority Data

Sep. 26, 2001 (JP) .................................. P2001-294929

(51) Int. Cl.$^7$ ............................................. G02F 1/1335
(52) U.S. Cl. .................... 349/113; 349/96; 349/112; 359/459
(58) Field of Search ............................. 349/112, 113, 349/64, 96

(56) References Cited

U.S. PATENT DOCUMENTS

| 6,108,064 A | 8/2000 | Minoura et al. |
| 6,204,903 B1 * | 3/2001 | Hayashi et al. ............. 349/113 |
| 2002/0044241 A1 * | 4/2002 | Matsuo ........................ 349/113 |

FOREIGN PATENT DOCUMENTS

| JP | 10-133022 | * 5/1998 |
| JP | 2000-131511 | * 5/2000 |

* cited by examiner

*Primary Examiner*—Toan Ton
(74) *Attorney, Agent, or Firm*—Sughrue Mion, PLLC

(57) ABSTRACT

A rough-surfaced layer of 0.1 to 1.0 μm in arithmetic mean roughness and 0.1 to 6.0 μm in average ten-point roughness is formed on the back surface of a light-transmitting high-molecular substrate having laminated thereon a semi-transmitting reflective layer to thereby form a semi-transmitting reflective plate. A semi-transmitting polarizer is formed by bonding and laminating thereon a polarizer.

6 Claims, 1 Drawing Sheet

SEMI-TRANSMITTING REFLECTIVE PLATE, SEMI-TRANSMITTING POLARIZER, AND LIQUID CRYSTAL DISPLAY USING SAME

The present application is based on Japanese Patent Application No. 2001-294929, which is incorporated herein by reference.

BACKGROUND OF THE INVENTION

1. Field of the Invention

This invention relates to a semi-transmitting reflective plate and a semi-transmitting polarizer to be used in a liquid crystal display (hereinafter sometimes abbreviated as "LCD"), and a liquid crystal display using the same.

2. Description of the Related Art

LCDs have been used in desktop computers, electronic watches, personal computers and word processors, and a demand for them has sharply been increased. Thus, production growth of semi-transmitting reflective displays for portable phones and personal portable information terminals is remarkable.

In order to improve display performance of LCD, a semi-transmitting polarizer comprising a polarizer having laminated thereon a semi-transmitting reflective plate is provided usually on the back side of a liquid crystal cell and, as a display method, there has been employed a method in which, in the case of using the liquid crystal display in a comparatively bright atmosphere, an incident light from watching side (display side) is reflected to display an image whereas, in the case of using in a comparatively dark atmosphere, an image is displayed using a built-in light source such as a backlight provided on the back side of the semi-transmitting polarizer. That is, the semi-transmitting polarizer can save energy for a light source such as a backlight under a bright atmosphere, while using a built-in light source under a comparatively dark atmosphere, thus being useful for formation of a liquid crystal display.

However, a recent reduction in thickness of LCD has made the space between respective constituent members so narrow that they are disposed almost close to each other. FIG. 2 is a schematic cross section showing an example of a constitution of a conventional semi-transmitting reflective plate. A semi-transmitting reflective layer 13 comprising a metallic film or a mica-buried resin layer is formed on a light-transmitting high-molecular substrate 11 such as PET, and an adhesive layer 14 is formed on the layer to constitute a semi-transmitting reflective plate 15. The semi-transmitting reflective plate 15 is disposed close to an EL back light 16. Hence, there have been problems that, with a semi-transmitting reflective plate having a smooth back surface, a Newton ring is viewed upon the back light being turned on since the back surface is adsorbed to the surface of an electroluminescence (hereinafter abbreviated as "EL") element, and that fine foreign matters sandwiched therebetween are viewed as impact deformation. In addition, there has also been involved a problem of generation of abnormal display due to the sandwiched foreign matters. Further, with the degree of fineness being increased, there has arisen a problem that fine flaws on the back side of the semi-transmitting reflective plate can be viewed upon transmission viewing.

SUMMARY OF THE INVENTION

Thus, the present invention is intended to provide a semi-transmitting reflective plate and a semi-transmitting polarizer which can depress generation of Newton ring and can prevent flaws due to the impact deformation or the sandwiched foreign matters, and a liquid crystal display using the same.

In order to solve the problems, the transmitting-reflective plate of the invention has a rough-surfaced layer of 0.1 to 1.0 $\mu$m in arithmetic mean roughness and 0.1 to 6.0 $\mu$m in average tem-point roughness formed on the back surface of a light-transmitting high-molecular substrate having laminated thereon a semi-transmitting reflective layer.

Also, in the semi-transmitting reflective plate of the invention, the rough-surfaced layer has a surface hardness of preferably H or more.

Also, in the semi-transmitting reflective layer of the invention, the rough-surfaced layer has a peeling strength of preferably 0.5 N/25 mm or more.

Next, the semi-transmitting polarizer of the invention is characterized in that the semi-transmitting reflective plate is laminated on a polarizer.

In addition, the liquid crystal display of the invention is characterized in that the semi-transmitting polarizer is provided on at least one side of a liquid crystal cell. In this liquid crystal display, it is preferred to dispose so that the rough-surfaced layer formed on the semi-transmitting polarizer is on the back side of the display unit of the liquid crystal display.

The arithmetic mean roughness (Ra) and the average ten-point roughness (Rz) in the above description are defined in JIS B0601-1994. As a method for determining these Ra and Rz, there is a method of using, for example, a surface roughness-measuring machine.

Features and advantages of the invention will be evident from the following detailed description of the preferred embodiments described in conjunction with the attached drawings.

DETAILED DESCRIPTION OF THE PREFERRED EMBODIMENTS

Figure 1:
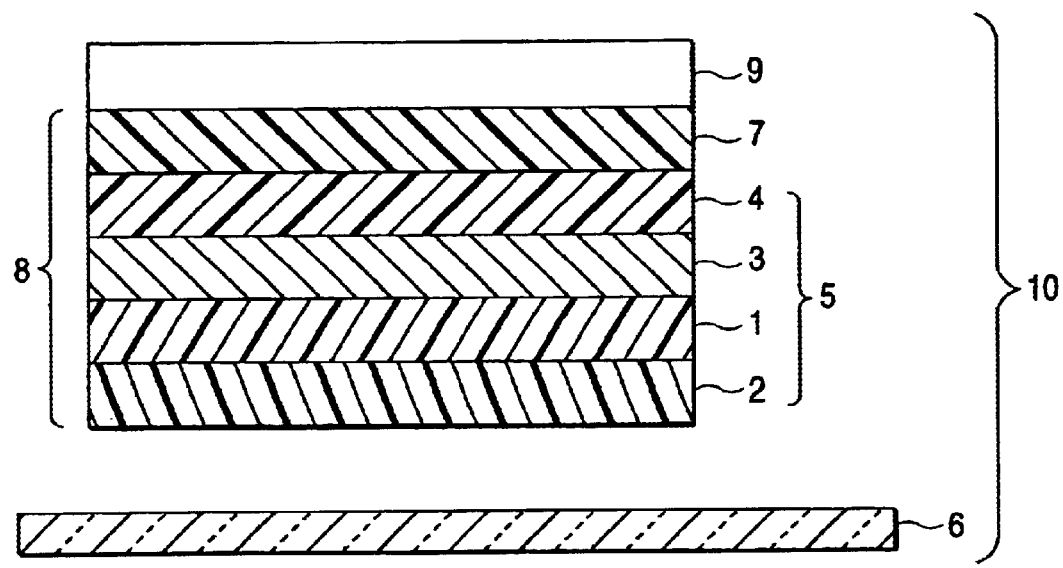
FIG. 1 is a schematic cross section showing an example of the constitution of the semi-transmitting reflective plate, semi-transmitting polarizer, and liquid crystal display of the invention.
Figure 2:
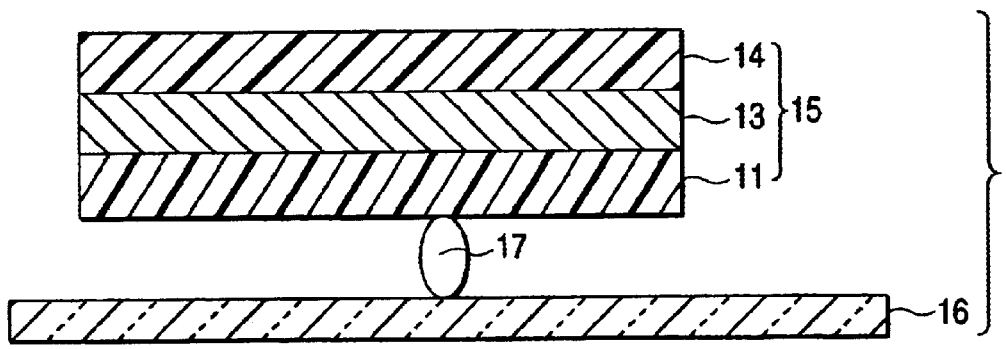
FIG. 2 is a schematic cross section showing an example of the constitution of the conventional semi-transmitting reflective plate.

In the semi-transmitting reflective plate of the invention, a rough-surfaced layer of 0.1 to 1.0 $\mu$m in arithmetic mean roughness (Ra) and 0.1 to 6.0 um in average ten-point roughness (Rz) is formed on the back surface of a light-transmitting high-molecular substrate having laminated thereon a semi-transmitting reflective layer. In the semi-transmitting reflective plate, Ra is more preferably 0.2 to 0.5 $\mu$m, and Rz is more preferably 1.0 to 4.0 $\mu$m. In case where the Ra is less than 0.1 um, they adsorb to each other with only a slight humidity, thus intended performance not being obtained, whereas, in case where the Ra exceeds 1.0 $\mu$m, unevenness of the rough surface can be viewed, thus not being desired. Also, in case where the Rz is less than 0.1 $\mu$m, they adsorb to each other with only a slight humidity, thus intended performance not being obtained, whereas, in case where the Rz exceeds 6.0 $\mu$m, unevenness of the rough surface can be viewed, thus not being desired.

As the light-transmitting high-molecular substrate, there may be used resins such as polyethylene terephthalate (PET), polycarbonate (PC), polyether sulfone (PES), polyvinyl alcohol (PVA) and triacetyl cellulose (TAC). They are not particularly limited as to thickness but, generally, the thickness is 6 to 100 um.

The semi-transmitting reflective layer is not particularly limited, and may be formed of, for example, a light-transmitting metal deposition film, a metal thin film or a resin layer containing fine particles of, for example, mica. Examples of metals to be used for the metal deposition film or the metal thin film include aluminum, silver, silver-palladium alloy and chromium.

Also, as the rough-surfaced layer, any one that has the aforesaid properties may be used with no particular limitation but, in order to prevent formation of flaws due to impact deformation or foreign matters sandwiched upon mounting, the surface hardness of the rough-surfaced layer be H or more, preferably 2H or more, still more preferably 3H or more.

Method for forming the rough-surfaced layer is not particularly limited, and there may be employed a method of laminating a rough-surfaced transparent film substrate on a light-transmitting high-molecular substrate, the surface of the transparent substrate having been roughened by a proper method of forming a fine uneven structure on the surface of the substrate, such as a method of roughening the surface of a substrate by sand blasting or embossing or a method of compounding transparent fine particles. In addition, the rough-surfaced layer may also be formed by a method of forming on the surface of a light-transmitting high-molecular substrate a cured resin film having an excellent hardness and sliding properties, such as a silicone-containing UV ray curable resin. Further, there may also be employed a method of forming a rough-surfaced film by coating on the light-transmitting high-molecular substrate a coating solution prepared by mixing fine particles of, for example, silica with a varying resin film-forming material, followed by drying the coated film. The thickness of the rough-surfaced layer is not particularly limited, but is generally 1 to 20 $\mu$m.

Also, in preparing for the case of directly bonding an EL back light, a diffuser or a prism sheet onto the back side of the rough-surfaced layer, the rough-surfaced layer has an adhesion force to the light-transmitting high-molecular substrate of preferably 0.5 N/25 mm or more, more preferably 5 N/25 mm or more, in terms of peeling strength.

FIG. 1 shows an example of the constitution of the semi-transmitting reflective plate of the invention. A semi-transmitting reflective layer 3 is formed on a light-transmitting high-molecular substrate 1, an adhesive layer 4 is formed thereon and, on the opposite side of the light-transmitting high-polymer substrate, there is formed a rogh-surfaced hard coat layer 2. In mounting in a display, it is disposed so that the semi-transmitting reflective plate 5 is over the EL back light 6, with the rough-surfaced layer 2 being toward the back side of the display, as shown in FIG. 1.

Also, the semi-transmitting polarizer 8 of the invention is constituted by laminating the semi-transmitting reflective plate 5 and a polarizer 7 as shown in FIG. 1. Additionally, in conducting lamination, a proper bonding means such as an adhesive may be employed.

The polarizer to be used in the invention is not particularly limited, but its fundamental constitution comprises a polarizing element composed of a polyvinyl alcohol-based polarizing film containing a dichroic substance having on the one side or both sides thereof a transparent protective film as a protective layer, with a proper adhesive layer such as an adhesive layer composed of a vinyl alcohol-based polymer intervening therebetween.

As the polarizing element (polarizing film), a proper one may be used which is obtained by subjecting a film composed of, for example, a vinyl alcohol series polymer such as polyvinyl alcohol or partially formal-converted polyvinyl alcohol to a proper treatment such as a dyeing treatment using a dichroic substance comprising iodine or a dichroic dye, a stretching treatment or a cross-linking treatment in a proper order or manner, and which transmits a linear polarized light when a natural light is incident upon it. In particular, those which are excellent in light transmittance or polarizing degree are preferred.

As a material for the protective film which is used to form the transparent protective layer on the one side or both sides of the polarizing element (polarizing film), a proper transparent film may be used. Examples of the polymer to be used include acetate series resins such as triacetyl cellulose are generally used, which, however, are not limitative at all.

The semi-transmitting polarizer is a polarizer having provided thereon a light-reflecting and light-transmitting, semi-transmitting reflective layer. The semi-transmitting polarizer can constitute a liquid crystal display of the type wherein the semi-transmitting polarizer is commonly provided on the back side of a liquid crystal cell and, in the case of using the liquid crystal display under a comparatively bright atmosphere, an incident light from the viewing side (display side) is reflected to display an image and, in the case of using the liquid crystal display under a comparatively dark atmosphere, an image is displayed using a built-in light source such as a backlight provided on the back side of the semi-transmitting polarizer. That is, the semi-transmitting polarizer is useful for constituting a liquid crystal display of the type in which, under a bright atmosphere, the semi-transmitting polarizer can save energy for the light source such as backlight and, even under a comparatively dark atmosphere, a built-in light source permits to view an image.

In the semi-transmitting reflective plate or the semi-transmitting polarizer of the invention may be provided an adhesive layer for bonding them to a member such as liquid crystal cell. Adhesives to be used for forming the adhesive layer are not particularly limited, and there maybe used proper ones such as acryl series ones, silicone series ones, polyester series ones, polyurethane series ones, polyether series ones and rubber series ones. It suffices to provide the adhesive layer on a necessary side as needed. The thickness of the adhesive layer is not particularly limited, either, and is generally 10 to 30 $\mu$m.

Additionally, in the case where the provided adhesive layer is laid bare at the surface, it is preferred to cover the adhesive layer by a separator (releasable film) for preventing it from being stained before use. The separator may be formed by, for example, coating a release agent such as a silicone series release agent, a long-chained alkyl series release agent, a fluorine-containing releasing agent or molybdenum sulfide as needed on a proper thin member.

Also, the liquid crystal display 10 of the invention is a device wherein the semi-transmitting polarizer 8 is disposed on at least one side of a liquid crystal cell 9 as shown in FIG. 1.

This liquid crystal display may be constituted as having a proper constitution in accordance with a conventional one wherein the polarizer is disposed on the one side or both sides of a liquid crystal cell. Thus, the liquid crystal display-constituting liquid crystal cell is not limited and, for example, there may be employed proper type liquid crystal cells such as active matrix-driving type liquid crystal cells represented by thin film transistor type liquid crystal cells; and simple matrix-driving type liquid crystal cells such as twist nematic type liquid crystal cells and super-twist nematic type liquid crystal cells.

In constituting the liquid crystal display, proper parts such as a prism array sheet, a lens array sheet, a light-diffusing plate and a back light may be disposed at an appropriate position or positions each as a single layer or two or more layers.

The invention is described more specifically by reference to Examples and Comparative Examples which, however, are not to be construed as limiting the invention.

EXAMPLE 1

A polarizer having a semi-transmitting reflective plate and having laminated on the back side thereof a light-transmitting transparent and colorless PET substrate (trade name: F4205P3; made by Nitto Denko Corporation) was prepared, and a rough-surfaced film of 25 µm in the thickness of its substrate, 25 µm in the thickness of the adhesive (tacky) layer and 5 µm in the coating thickness of the surface-roughening layer (trade mane: AG30-PET; made by Nitto Denko Corporation) was laminated on the PET substrate positioned on the back side to obtain a semi-transmitting polarizer having formed thereon the rough-surfaced layer.

Additionally, measurement of the surface roughness of the rough-surfaced film using a profilometer (Talysurf; manufactured by Taylor Hobson Co.) revealed that Ra and Rz were 0.24 µm and 2.16 µm, respectively. Also, measurement of the surface hardness using a pencil hardness tester (Clemense type scratch hardness tester; manufactured by Tester Sangyo Co., Ltd.) revealed that the hardness was 3H.

Subsequently, an EL back light closely positioned to this semi-transmitting polarizer was turned on, and was viewed in a transmitting mode. No Newton ring was viewed.

Also, an abrasive (Corundum #240; average particle size: about 100 µm) was sandwiched in the narrow space therebetween, but no impact deformation detrimentally affecting the display was observed.

Also, with the semi-transmitting polarizer, adhesion force (peeling strength) of the rough-surfaced layer to the PET substrate was measured to be 20 N/25 mm or more according to 180-degree peeling test at a peeling rate of 0.3 m/min using a utility tensile tester, Tensilon, with the rough-surfaced layer not being peeled.

EXAMPLE 2

A compound liquid prepared by adding 2 parts by weight of a silica filler (SYLYSIA; made by Fuji Silysia K.K.) to 100 parts by weight of a hard coating agent (trade name: UNIDIC; made by Dainippon Ink and Chemicals, Inc.), followed by dispersing, was coated on the PET substrate disposed on the back side of the polarizer having a semi-transmitting reflective plate (trade name: EGW4225PG; manufactured by Nitto Denko Corporation) to thereby form a rough-surfaced film of 5 um in thickness, thus a semi-transmitting polarizer having formed thereon the rough-surfaced layer being obtained.

As a result of evaluating performance of the rough-surfaced film in the same manner as in Example 1, Ra, Rz and pencil hardness were found to be 0.3 µm, 2.66 µm, and 2H, respectively.

Subsequently, an EL back light closely positioned to this semi-transmitting polarizer was turned on, and was viewed in a transmitting mode. No Newton ring was viewed.

Also, an abrasive (Corundum #240; average particle size: about 100 um) was sandwiched in the narrow space therebetween, but no impact deformation detrimentally affecting the display was observed.

Also, the adhesion force (peeling strength) of the rough-surfaced film to the substrate was measured by the 180-degree peeling test in the same manner as in EXAMPLE 1 to be 9.8 N/25 mm.

EXAMPLE 3

A coating liquid prepared by adding 2 parts by weight of a silica filler (SYLYSIA; made by Fuji Silysia K.K.) to 100 parts by weight of a hard coating agent (trade name: UNIDIC; made by Dainippon Ink and Chemicals, Inc.), followed by dispersing, was coated on the PET substrate (T600; made by Toray Co., Ltd.) in a coating thickness of about 5 µm to thereby form a rough-surfaced film of 5 µm in thickness, followed by drying and curing with UV, thus a hard coating layer having an unevenness with the same properties as in Example 2 being obtained. On the smooth surface of the PET film having the hard coating layer was coated a mica filler-containing adhesive stock solution, followed by drying to thereby form an adhesive layer having optical performance corresponding to that of the semi-transmitting reflective plate made by Nitto Denko Corporation.

A polarizer was laminated on the thus-obtained rough-surfaced, hard coated semi-transmitting reflective plate via an adhesive layer to thereby obtain a polarizer having laminated thereon a semi-transmitting reflective plate (semi-transmitting polarizer).

Subsequently, an EL backlight closely positioned to this semi-transmitting polarizer was turned on, and was viewed in a transmitting mode. No Newton ring was viewed.

Also, an abrasive (Corundum #240; average particle size: about 100 µm) was sandwiched in the narrow space there between, but no impact deformation detrimentally affecting the display was observed.

EXAMPLE 4

A coating liquid prepared by dispersing 2 parts by weight of a silica filler (SYLYSIA; made by Fuji Silysia K.K.) in 100 parts by weight of a hard coating agent (trade name: UNIDIC; made by Dainippon Ink and Chemicals, Inc.) was coated on the PET substrate (T600; made by Toray Co., Ltd.) in a coating thickness of about 5 µm, followed by drying and curing with UV, thus a hard coating layer having an unevenness with the same properties as in Example 2 being obtained. On the smooth surface of the thus-obtained PET film having the hard coating layer was deposited metallic aluminum in a thin film form to thereby form a semi-transmitting reflective mirror of 70% in reflectivity and 10% in transmittance. On the aluminum-deposited side of the semi-transmitting reflective mirror having the rough-surfaced hard coat was coated an adhesive stock solution containing truely spherical silica filler (Tospearl; made by Toshiba Silicone), followed by drying, to thereby form a diffusible adhesive layer having a thickness of 25 µm and a haze of about 80.

A polarizer was laminated on the thus-obtained rough-surfaced, hard coated semi-transmitting reflective plate via an adhesive layer to thereby obtain a polarizer having laminated thereon a semi-transmitting reflective plate (semi-transmitting polarizer).

Subsequently, an EL backlight closely positioned to this semi-transmitting polarizer was turned on, and was viewed in a transmitting mode. No Newton ring was viewed.

Also, an abrasive (Corundum #240; average particle size: about 100 μm) was sandwiched in the narrow space there between, but no impact deformation detrimentally affecting the display was observed.

Comparative Example 1

An EL backlight was closely positioned to a polarizer having provided thereon a semi-transmitting reflective plate (F4205P3; made by Nitto Denko Corporation), was turned on, and was viewed in a transmitting mode. Newton ring was viewed.

Also, when an abrasive (Corundum #240; average particle size: about 100 μm) was sandwiched in the narrow space therebetween, impact deformation detrimentally affecting the display was observed.

As has been described here in before, the invention provides a semi-transmitting polarizer which, when closely disposed to an EL back light, does not generate Newton ring owing to formation of a rough-surfaced layer on the back side of a light-transmitting high-molecular substrate having laminated thereon a semi-transmitting reflective layer. In addition, even when fine foreign matters are sandwiched there between, there are generated no impact deformation which adversely affecting display.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A semi-transmitting reflective plate comprising:
    a light-transmitting high-molecular substrate;
    a semi-transmitting reflective layer laminated on a first side of said substrate; and
    a rough-surfaced layer of 0.1 to 1.0 μm in arithmetic mean roughness and 0.1 to 6.0 μm in average ten-point roughness and being formed on a second side of the substrate, such that the rough-surfaced layer is spaced apart from the semi-transmitting reflective layer.

2. A semi-transmitting reflective plate according to claim 1, wherein the rough-surfaced layer has a surface hardness of H or harder than that.

3. A semi-transmitting reflective plate according to claim 1, wherein the rough-surfaced layer has a peeling strength of 0.5 N/25 mm or more.

4. A semi-transmitting polarizer, which comprises the semi-transmitting reflective plate according to claim 1 having laminated thereon a polarizer.

5. A liquid crystal display, in which the semi-transmitting polarizer according to claim 4 is provided on at least one side of a liquid crystal cell.

6. A liquid crystal display according to claim 5, wherein the semi-transmitting polarizer is provided so that the rough-surfaced layer formed in the semi-transmitting polarizer is on the back side of the display unit of the liquid crystal display.

* * * * *